F. A. LITTLEFIELD.
STEAM TRAP.
APPLICATION FILED APR. 3, 1911.

1,218,603.

Patented Mar. 6, 1917.
3 SHEETS—SHEET 1.

Witnesses:
Carl L. Choate.
Horace A. Crossman

Inventor:
Frank A. Littlefield,
by Emery, Booth, Janney and Varney,
Attys.

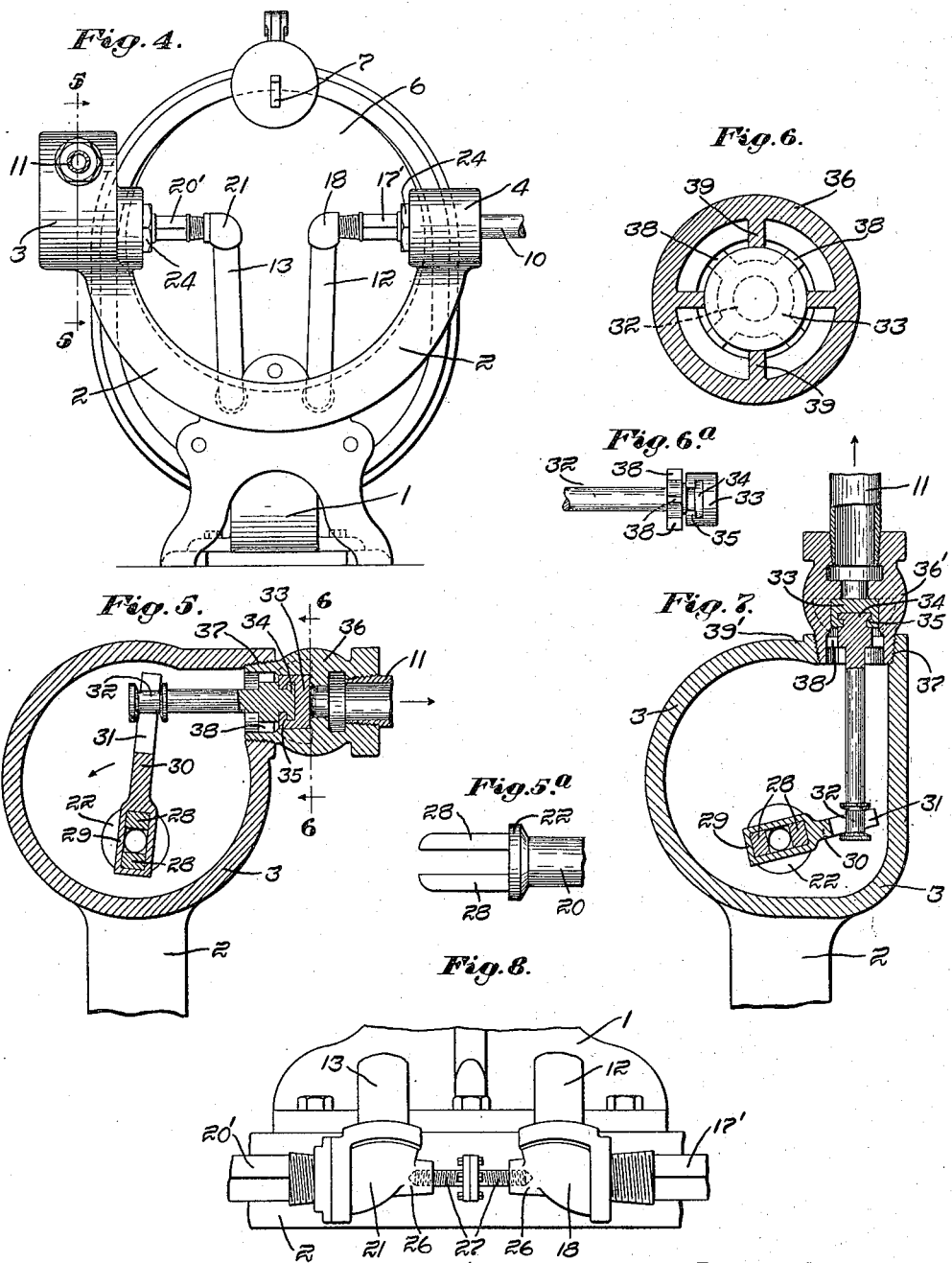
F. A. LITTLEFIELD.
STEAM TRAP.
APPLICATION FILED APR. 3, 1911.
1,218,603.
Patented Mar. 6, 1917.
3 SHEETS—SHEET 2.

F. A. LITTLEFIELD.
STEAM TRAP.
APPLICATION FILED APR. 3, 1911.

1,218,603.

Patented Mar. 6, 1917.
3 SHEETS—SHEET 3.

Witnesses:
Carl L. Choate.
Horace A. Crossman.

Inventor:
Frank A. Littlefield,
by
Emery, Booth, Janney and Varney,
Attys.

UNITED STATES PATENT OFFICE.

FRANK A. LITTLEFIELD, OF NASHUA, NEW HAMPSHIRE, ASSIGNOR TO NASHUA MACHINE CO., OF NASHUA, NEW HAMPSHIRE, A CORPORATION OF MAINE.

STEAM-TRAP.

1,218,603.   Specification of Letters Patent.   Patented Mar. 6, 1917.

Application filed April 3, 1911. Serial No. 618,559.

*To all whom it may concern:*

Be it known that I, FRANK A. LITTLEFIELD, a citizen of the United States, and a resident of Nashua, in the county of Hillsboro and State of New Hampshire, have invented an Improvement in Steam-Traps, of which the following description, in connection with the accompanying drawings, is a specification, like letters on the drawings representing like parts.

This invention pertains to tank traps and return traps, particularly of the tilting type, and may be embodied in that general type of trap shown and described in my United States Letters Patent No. 893,529, dated July 14, 1908.

In order that the principle of the invention may be readily understood, I have disclosed a single embodiment thereof in the accompanying drawings, wherein—

Fig. 4 is an end elevation of the trap shown in Fig. 1;

Fig. 5 is a vertical section through one of the trunnions upon the line 5—5 of Fig. 4, and showing the valve and its operating means;

Figure 2:
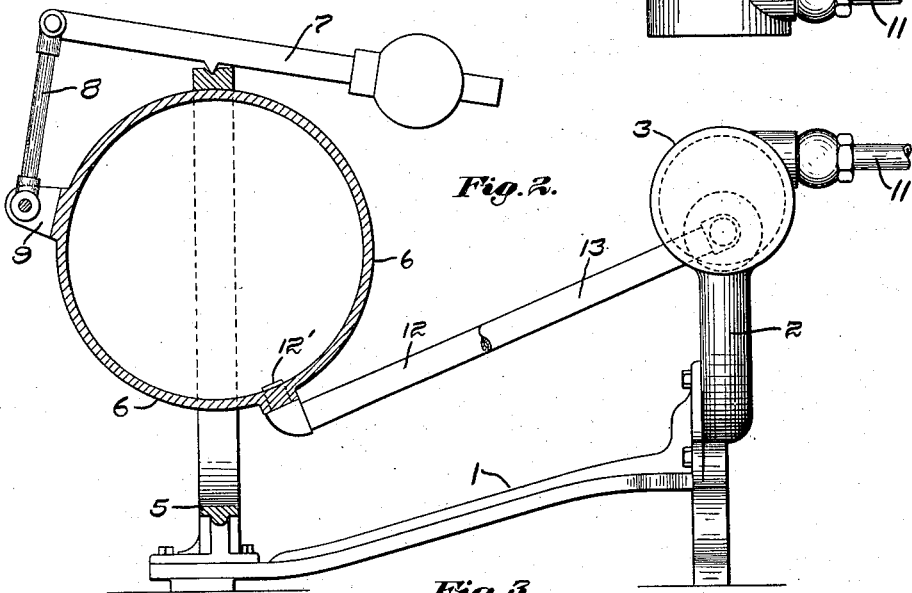
Fig. 2 is a view partially in vertical section and partially in side elevation of the trap shown in Fig. 1 when in its elevated position.
Figure 9:
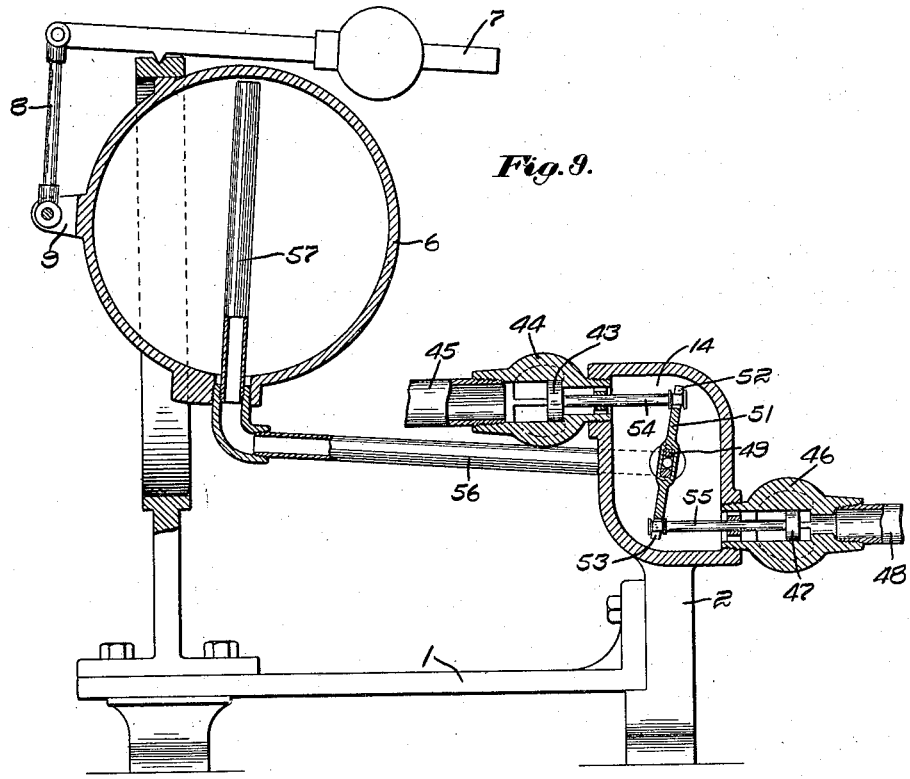

Fig. 5ª is a detail representing one end of the outlet pipe;

Fig. 6 is a vertical section upon the line 6—6 of Fig. 5;

Fig. 6ª is a detail of the valve head;

Fig. 7 is a view similar to Fig. 5 of a modified arrangement of valve and operating means therefor;

Fig. 8 is a plan view of a modified form of my invention applicable for use with both tank or return traps;

Fig. 9 is a view generally similar to Fig. 2 of a return trap; and

Figure 3:
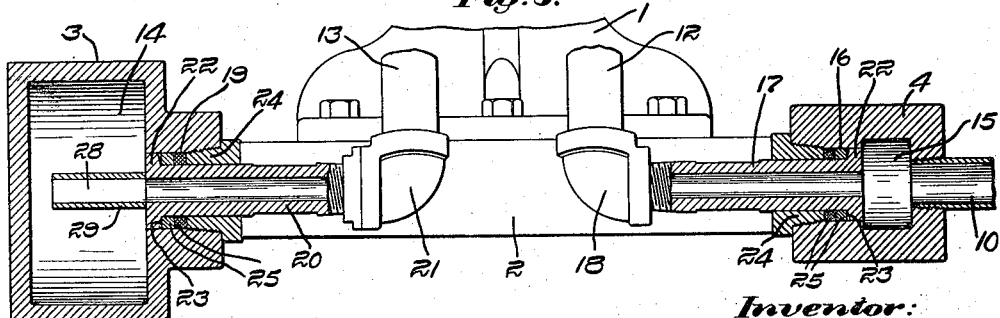
Fig. 3 is a view partially in plan and partially in transverse section of the trap trunnions and pipe connections therewith.
Figure 10:
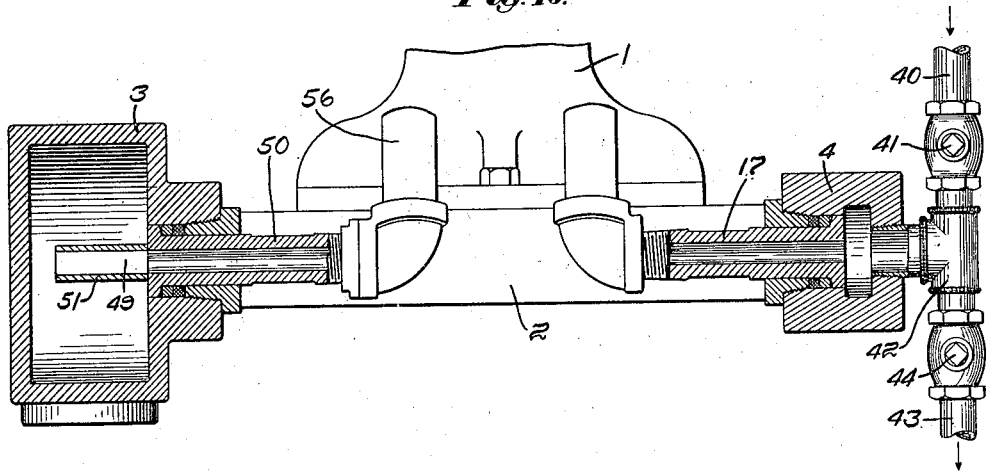

Fig. 10 is a view similar to Fig. 3 of the trunnions and pipe connections for said return trap.

While the steam trap herein disclosed may in certain aspects thereof be of general application, it is more particularly intended for use as a tank trap and as a return trap. In Figs. 1 to 7 inclusive, I have represented a tank trap and in Figs. 9 and 10 a return trap, the construction shown in Fig. 8 being applicable to either type of trap.

Figure 1:
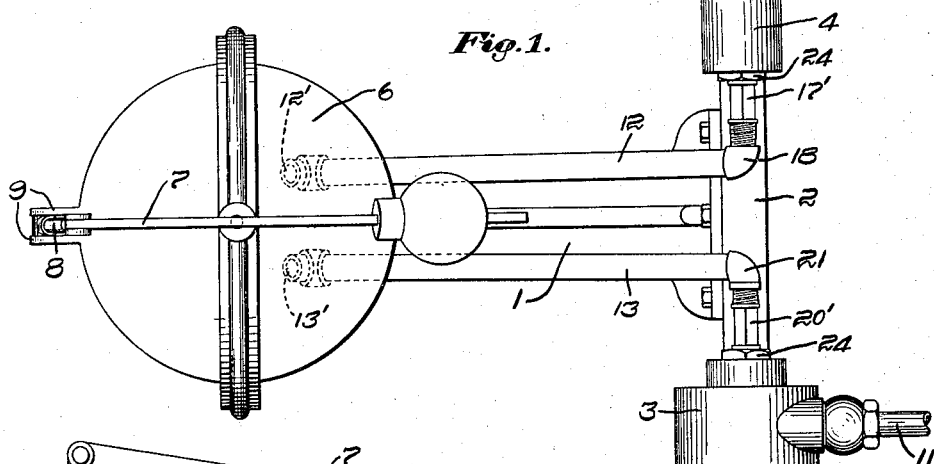
Figure 1 is a plan view of a tank trap embodying my invention.

Referring more particularly to the drawings and first to that type of trap shown in Figs. 1 to 7 inclusive, the base or tripod whereon the various parts of the trap are supported is indicated at 1, it preferably having a tubular yoke 2 generally similar to that shown in my Patent No. 491,486, February 8, 1893, the ends of the yoke arms being represented at 3, 4 in Figs. 1, 3 and 4. Upon the base 1, I preferably bolt or otherwise mount or form a ring like frame 5, within which is received a bowl 6 of any suitable shape, but preferably spherical for convenience and economy of manufacture and to insure strength. The bowl is mounted to tilt as hereinafter described, and when in its elevated position, as shown in Fig. 2, it contacts with the inner face of the upper portion of the ring like frame 5. The downward movement of the bowl is limited by the inner face of the lower portion of said frame.

In that form of my invention herein illustrated, the bowl is elevated when empty and descends when filled. Any suitable means may be employed to move the bowl to its filling position; that is, to its elevated position, viewing the present type of my invention. Herein for the purpose, I have provided a counterweighted lever 7 connected by a link 8 with an ear 9 on the bowl 6. In the particular form of weighted lever and link shown, the operation of the tank is rendered desirably prompt and accurately responsive to predetermined conditions of water in the bowl, substantially in the manner described in my Patent, No. 893,529, July 14, 1908. It is apparent, however, that within the scope of my invention any other suitable means for tilting the bowl may be utilized.

In accordance with my invention, I provide the bowl 6 with suitable pipes to lead the water of condensation thereinto and to discharge it therefrom and mount said pipes for a rocking movement upon and with respect to the yoke arms 3, 4. Heretofore, so far as I am aware, in order to provide tight joints between the pipes leading to and from the bowl and the supports whereon they are mounted, it has been necessary to provide a pipe encircling spring or springs, and it has been customary to provide a head or trunnion whereon the bowl has been directly mounted for oscillation. The provision of such head or trunnion has necessitated the employment of expensive metal, which must be machined and otherwise treated to serve the required purpose. It is an important feature of my invention to provide a trap at a comparatively low expense. I am enabled by my invention to dispense with the head or trunnion of the character referred to and thus to reduce the amount of expensive metal heretofore employed and machining heretofore resorted to, and also to dispense with the use of springs to maintain a tight joint between the relatively movable parts.

In accordance with the present type of my invention, I introduce the water of condensation through the pipe 10 into the arm 4 of the yoke 2 and discharge the water from the bowl of the trap through the arm 3 of the yoke and the outlet pipe 11 leading therefrom to any suitable point. I provide the bowl 6 at preferably the under side thereof with inlet and outflow pipes 12, 13, here shown as threaded into the bowl at 12′, 13′. The opposite ends of said pipes are mounted for rocking movement in the arms 3, 4 of the yoke 2, which are preferably so cast as to provide chambers 14, 15. Into the latter chamber is threaded the inlet pipe 10 and preferably opposite said pipe is provided a passage 16 wherein is mounted for oscillation the short horizontal pipe 17, the opposite end whereof is threaded into an elbow 18 upon the end of the inlet pipe 12 into the bowl 6. Similarly the arm 3 is provided with a passage 19 for the reception of the oscillatory pipe 20, the opposite end thereof being threaded into the elbow 21 threaded upon the discharge pipe 13.

In order to provide a close joint between the pipes 17, 20 and the chambers 15, 14 with which they respectively communicate, I preferably provide the inner end of each of said pipes with an annular flange 22 having a beveled face 23. Surrounding each pipe and threaded into its arm, I provide a preferably tapered nut 24, and between the inner face thereof and the flange 22 of each pipe I provide one or more suitable packing rings 25, two being herein shown. I provide the beveled faces 23 of the flanges 22 to permit the easy oscillation of said pipes 17 and 20 with respect to the packing.

The pipes 17 and 20 are arranged coaxially with respect to each other and serve as the axis of rotation for the bowl 6. While any suitable means may be employed to maintain a tight joint between said pipes 17 and 20 and the arms of the yoke 2, I preferably do away with the pipe encircling springs heretofore commonly used.

The inlet and outlet pipes 12 and 13 are arranged in substantially the same plane, but instead of being parallel with each other, they slightly diverge from the points of attachment 12′ and 13′ to the bowl 6 to their points of attachment to the pipes 17 and 20. Said pipes are straight and being strained from each other in the assembling thereof to impart said divergence, their tendency is to move into parallelism, and therefore to draw the flanges 22 of the pipes 17, 20 tightly against the packing rings 25. Each of said pipes is provided with a squared portion 17′, 20′ respectively, to permit the application of a wrench in order to rotate the same in assembling the parts or for necessary adjustment, particularly of the valve, as will be hereinafter more fully set forth. Moreover the pressure of the inflowing steam and water of condensation through the pipe 17 tend to hold said pipe tightly seated.

Instead of relying upon the tendency of the pipes 12 and 13 to move into parallelism to maintain a tight joint between the pipes 17 and 20 and their packing, I may provide any other suitable means. For example, in Fig. 8, I have represented the elbows 18, 21 as provided with internally threaded bosses 26 receiving therein the oppositely threaded screw 27, by manipulation of which the pipes 12, 13 may be strained toward each other to any desired extent and the pipes 17, 20 drawn into more intimate engagement with their packings 25.

When the trap is used as a tank trap, but a single valve is required, namely, the outlet valve. The said valve, its casing and operating means are represented most clearly in Figs. 3, 5, 5ᵃ, 6 and 6ᵃ. Therein, the end of the pipe 20 that is received within the chamber 14 of the arm 3 is provided with a forked end 28 over which is slipped the slotted end 29 of an arm or link 30 having a forked end 31 between the members of which is received the stem 32 of a valve having a preferably detachable head 33. Said head may be applied in any suitable way to the spindle 32, but preferably the latter is provided at its outer end with an enlargement 34, onto which the valve head 33 is adapted to be slipped laterally, said valve head being undercut as indicated at 35 and having a portion thereof cut away as indicated in Fig. 6ª to permit said lateral application thereof to the valve stem.

The valve head 33 is received within a suitable valve casing 36 threaded at 37 into the wall of the arm 3,—that is of the chamber 14, and oppositely threaded as indicated for the reception of the outlet pipe 11. In order suitably to guide and position the valve, the valve stem is preferably provided with a series of radiating members 38 here shown as four in number engaging the inner face of the valve casing 36, the latter being represented in Fig. 6 as provided with intermediate inwardly projecting ribs 39 to engage the head of the valve and guide it in its reciprocating movement. It is obvious that by applying a wrench to the squared portion 20' of the pipe 20, the valve head 33 may be adjusted more closely to its seat. It will also be noted that the link or arm 30 can be readily inserted into the chamber 14 through the opening therein for the valve casing 36, and that the forked end of the pipe 20 can be readily positioned in the slotted end 29 thereof.

When the bowl 6 is elevated,—that is, when the bowl is empty,—the valve 33 is held closed by reason of the position of the arm or link 30. When, however, the bowl 6 is filled and descends, the pipes 17 and 20 are oscillated in the arms 3, 4 of the yoke 2. The oscillation of the pipe 20 turns the forked end 28 thereof in the direction of the arrow upon Fig. 5 and moves the valve 33 inwardly, thereby opening the same and permitting the discharge of the water of condensation.

The valve casing may be positioned at any suitable point upon the wall of the chamber 14. In Fig. 7, I have represented the valve casing at 36' and as threaded into the upper face 39 of said chamber 14.

In Figs. 9 and 10, I have indicated the trap embodying my invention as used for a return trap. Therein, the structure of the bowl 6, the counterweighting means therefor and the pipe connections to the bowl, together with the means for mounting the same for oscillatory movement may and preferably do remain as illustrated in Figs. 1 to 6 inclusive. In order, however, to permit the trap to be used as a return trap, I preferably introduce the water of condensation through one yoke arm into the trap and return it to the bowl through the same yoke arm. In order to provide suitable steam pressure within the trap so as to permit the water of condensation to be returned to the boiler, I introduce live steam into the bowl through the opposite yoke arm and also provide a suitable vent through said opposite yoke arm.

The water of condensation is introduced through the pipe 40 into the arm 4 of the yoke 2, a check valve 41 being provided to prevent the return of the water of condensation through said pipe. Said pipe 40 is provided with a T coupling 42 having attached thereto the return pipe 43 for the water of condensation to the boiler, a check valve 44 being employed to prevent the water of condensation entering through the pipe 40 from passing directly into the return pipe 43.

When the trap is used as a return trap, I provide a live steam valve and a vent valve and oppositely operate the same by the tilting of the trap, so that when the live steam valve is opened the vent valve is closed, and vice versa. In Fig. 9, I have indicated the live steam valve at 43 mounted for sliding movement within a valve casing 44 threaded into the wall of the chamber 14 and having the live steam inlet pipe 45 threaded thereinto as indicated. This valve may be similar in all respects to the valves 32, 33. Also threaded into the wall of the chamber 14 is a valve casing 46 for the vent valve 47, a vent pipe 48 leading from said casing to any suitable point of discharge. This valve may also be similar in all respects to the valves 32, 33. In order to operate said valves 43, 47 oppositely by the oscillation of the bowl 6, I mount upon the forked end 49 of the pipe 50, serving both as a live steam inlet and vent pipe, a lever 51 having its forked ends 52, 53 engaged with the valve stems 54, 55 of the live steam and vent valves 43, 47. Obviously when the bowl 6 is elevated and empty, the vent valve 47 is opened and when the bowl 6 fills and descends the vent valve 47 is thereby closed and the live steam valve 43 opened, thus permitting the live steam to enter the pipe 56 extending from the pipe 50. When the trap is used as a return trap, pipe 56 is provided with an extension 57 within the bowl 6 leading to a point near the top thereof, so as to discharge the steam into the bowl upon the surface of the water of condensation, thereby equalizing the steam pressure in the bowl, the water being then discharged by gravity.

It is evident from the foregoing description that the herein described trap, while thoroughly efficient as a tank trap and as a return trap, is of simple construction and can be built at comparatively slight cost. Owing to the fact that a comparatively small amount of expensive metal is needed and that the amount of machine work is comparatively little, the cost of the trap, both as regards the initial cost of the metal and of the work thereon, is reduced to a minimum.

Having thus described one illustrative embodiment of my invention, I desire it to be understood that although specific terms are employed, they are used in a generic and descriptive sense and not for purposes of limi- tation, the scope of the invention being set forth in the following claims.

Claims:

1. A steam trap provided with a yoke having opposed arms, a tilting receptacle, and pipes journaled in and communicating with said arms, said opposed arms and pipes having co-acting joint forming faces and being relatively movable in the direction of the axes of said pipes to establish a tight joint, said pipes having angular parts communicating with and supporting said receptacle, said pipes having provision inherent therein for maintaining said joint tight.

2. A steam trap comprising in combination a yoke having opposed arms, substantially horizontal pipes mounted for oscillation in and communicating with said arms, a tilting receptacle, and a pair of pipes in substantially the same plane communicating with said oscillatory pipes and with said receptacle said oscillatory pipes being drawn toward each other by said pair of pipes.

3. A steam trap comprising in combination a yoke having opposed arms, oscillatory pipes mounted in and communicating with said arms, said arms and pipes having co-acting joint forming faces, an outlet valve in one of said arms, a tilting receptacle, and pipes extending from said oscillatory pipes and supporting said receptacle, said latter pipes holding said arms and oscillatory pipes in joint forming relation.

4. A steam trap comprising in combination a yoke having opposed arms, a pair of oscillatory pipes mounted therein, said arms and pipes having co-acting joint forming faces, a tilting receptacle connected to said pipes, and means to draw said pipes axially toward each other, thereby to maintain a tight joint between the said faces of said pipes and said yoke arms.

5. A steam trap comprising in combination a yoke having opposed arms, a pair of oscillatory horizontal pipes mounted in and communicating with said arms, said arms and pipes having co-acting joint forming faces, a tilting receptacle supported by said pipes and communicating therewith, and means to draw said oscillatory pipes axially toward each other, thereby to maintain a tight joint.

6. A steam trap comprising in combination a yoke having opposed arms, a pair of oscillatory, substantially horizontal pipes mounted in and communicating therewith, a tilting receptacle and pipes 12, 13 communicating with said receptacle and said oscillatory pipes, said pipes being strained and diverging from each other at their points of attachment to said oscillatory pipes, thereby to draw the latter toward each other.

7. A steam trap comprising in combination a yoke having opposed arms, substantially horizontal pipes 17, 20 mounted for oscillation in said arms, said arms and pipes having co-acting joint forming faces, pipes 12, 13 communicating with and angularly directed with respect to said pipes 17, 20, said pipes 12 and 13 being forced toward each other to establish a tight joint at said faces, and tilting receptacle 6 supported by said pipes 12, 13.

8. A steam trap comprising in combination a receptacle, a yoke having opposed arms of which one is an outlet, substantially horizontal pipes 17, 20 mounted for oscillation in said arms and capable of movement toward and from each other, pipes 12, 13 communicating with and angularly directed with respect to said pipes 17, 20, a tilting receptacle 6 supported by said pipes 12, 13, a valve for the outlet arm and lever connections separate from said connections to open and close said valve by the tilting of said receptacle.

9. A steam trap comprising in combination, a yoke having opposed arms, oscillatory pipes mounted in and communicating with said arms, a tilting receptacle in communication with said arms, spaced pipes sprung toward each other connecting said receptacle with said oscillatory pipes, an outlet valve in one of said arms, and means directly engaging one of said oscillatory pipes for opening and closing said valve.

10. A steam trap comprising in combination a yoke having opposed arms 3, 4, oscillatory pipes 20, 17 distinct from and capable of movement with respect to each other, said pipe 20 having a valve operating extension within said arm 3, a valve within said arm and a member 30 mounted upon said pipe extension and connected to said valve to open and close the same.

11. A steam trap comprising in combination a yoke having arms 3, 4, non-communicating independent pipes 20, 17 mounted for oscillation therein, said pipe 20 having an extension within the arm 3, a link 30 mounted upon said extension, a sliding valve mounted within said arm and operated by said link, a tilting receptacle and pipes connecting said receptacle and said pipes 20, 17.

12. A steam trap comprising in combination a yoke having opposed arms, oscillatory pipes 17, 20 mounted in and communicating with said arms, said arms and pipes having co-acting joint forming faces, said pipes being movable toward each other to establish a tight joint thereat, pipes 12, 13 carried by said arms, tilting receptacle 6 supported by and communicating with said pipes 12, 13, and counterweighting lever 7 and link 8 directly attached to said receptacle.

13. A steam trap comprising in combination a yoke having opposed arms, a pair of oscillatory and axially movable pipes 17, 20 mounted in and communicating with said arms, a tilting receptacle 6 and pipes supporting and communicating with said receptacle and in communication with said pipes 17, 20.

14. A steam trap comprising in combination a yoke having opposed arms, pipes 17 and 20 mounted for oscillation therein, said pipes having flanges 22, nuts 24 and packing members 25, and a tilting receptacle in communication with said pipes 17, 20.

15. A steam trap comprising in combination a yoke having opposed arms, pipes 17, 20 mounted for oscillation therein, said pipe having flanges 22, nuts 24, and packing members 25, means acting longitudinally of said pipes 17, 20 to force said flanges 22 against said packing 25, a tilting receptacle and pipes connecting said receptacle to said oscillatory pipes 17, 20.

16. A steam trap comprising in combination a yoke having opposed arms, pipes 17, 20 mounted for oscillation therein, means for straining said pipes toward each other and a tilting receptacle in communication with and supported by said arms.

17. A steam trap comprising in combination a yoke having opposed arms, a pair of oscillatory pipes mounted in and communicating with said arms having free adjacent ends and having laterally extending pipe connections, means for straining said oscillatory pipes toward each other and a tilting receptacle supported upon said pipe connections.

18. A steam trap comprising in combination a yoke having opposed arms, oscillatory pipes 17, 20 mounted in and communicating with said arms and having lateral pipe extensions, a tilting receptacle carried by said pipe extensions, an outlet valve within one of said arms, valve seats therefor, and valve operating means directly applied to said pipe 20 and connected to the valve, said pipe 20 being rotatably adjustable to tighten said valve to its seat.

19. A steam trap comprising in combination a yoke having opposed combined steam and condensation water inlet and water outlet arms, oscillatory pipes 17, 20 mounted in and communicating with said arms, a tilting receptacle supported from said arms, a sliding valve mounted in the outlet arm and a link slid onto said pipe 20 and connected to said valve to open and close the same by the tilting of the receptacle.

20. A steam trap comprising in combination a yoke having arms 3, 4, oscillatory pipes 20, 17 mounted in and communicating respectively with said arms having free adjacent ends, and a tilting receptacle 6 supported from and communicating with said oscillatory pipes, a valve casing secured to the wall of said arm 3, a valve in said casing, and means directly applied to the pipe 20 to open and close said valve.

21. A steam trap comprising in combination a yoke having opposed arms constituting trunnions for the trap, an inlet and outlet for the water of condensation in communication with one of said arms, a live steam inlet and vent in communication with the other of said arms, alining oscillatory pipes mounted in and communicating with said trunnion arms spaced from each other and having laterally extending portions, a tilting receptacle carried by said laterally extending portions, oppositely acting live steam and vent valves, and means within one of said arms and connected to the adjacent oscillatory pipe for opening and closing said valves.

22. A steam trap comprising a yoke having opposed arms, a pair of oscillatory pipes mounted in and communicating therewith, a tilting receptacle, and pipes 12, 13 connected with said receptacle and said oscillatory pipes, said pipes 12, 13 being strained from each other at their points of attachment to said oscillatory pipes, whereby said pipes 12, 13 tend normally to draw said oscillatory pipes toward each other.

23. A steam trap provided with a yoke having opposed arms, a tilting receptacle, and pipes extending outwardly from each other and journaled in and communicating with said arms, said pipes having annular parts communicating with and supporting said receptacle, said opposed arms and pipes having co-acting joint forming faces and being relatively movable in the direction of the axes of said pipes to establish a close joint.

24. A steam trap comprising in combination a yoke having opposed arms 3—4, oscillatory pipes 20—17 sprung toward each other, said pipe 20 having a valve operating extension within said arm 3, a valve within said arm, and a member 30 mounted upon said pipe extension and connected to said valve to open and close the same.

25. A steam trap comprising in combination a yoke having opposed arms 3—4, pipes 20—17, mounted for oscillation therein and sprung toward each other, said pipe 20 having an extension within the arm 3, a link 30 mounted upon said extension, a sliding valve mounted within said arm and operated by said link, a tilting receptacle, and pipes connecting said receptacle and said pipes 20—17.

26. A steam trap comprising in combination a yoke having opposed arms, pipes 17—20 mounted for oscillation therein and inherently movable toward each other, and a tilting receptacle in communication with and supported by said pipes.

27. A steam trap comprising in combination a yoke having opposed arms, oscillatory pipes 17—20 mounted in and communicating with said arms, said oscillatory pipes being sprung toward each other, a tilting receptacle supported from said arms, a sliding valve mounted in the outlet arm, and a link slid on to said pipe 20 and connected with said valve to open and close the same by operating the receptacle.

In testimony whereof, I have signed my name to this specification, in the presence of two subscribing witnesses.

FRANK A. LITTLEFIELD.

Witnesses:
JOHN R. SPRING,
C. K. ASHE.

Copies of this patent may be obtained for five cents each, by addressing the "Commissioner of Patents, Washington, D. C."